United States Patent [19]
Wittman

[11] Patent Number: 5,313,910
[45] Date of Patent: May 24, 1994

[54] BIRD FEEDER SUPPORT SYSTEM

[76] Inventor: Byd Wittman, 5440 Teal Cir., Shorewood, Minn. 55331

[21] Appl. No.: 25,612

[22] Filed: Mar. 3, 1993

[51] Int. Cl.[5] .......................... A01K 39/00; E04B 1/72
[52] U.S. Cl. ........................ 119/57.9; 248/303; 248/534; 52/101; 119/52.3
[58] Field of Search ............ 119/57.8, 57.9, 52.2, 119/52.3; 248/534, 538, 121, 535, 536, 159, 303, 103; 52/101

[56] References Cited

U.S. PATENT DOCUMENTS

| | | | |
|---|---|---|---|
| D. 69,516 | 2/1926 | Klein . | |
| 281,832 | 7/1883 | Bryan | 248/534 |
| 417,997 | 12/1889 | Dupuis | 248/535 |
| 1,554,118 | 9/1925 | Moran | 248/103 |
| 2,487,087 | 11/1949 | Anderson | 119/26 |
| 2,698,726 | 1/1955 | Howe | 248/121 |
| 2,891,508 | 6/1959 | Bower . | |
| 3,083,687 | 4/1963 | Slaven . | |
| 3,182,635 | 5/1965 | Waite . | |
| 4,030,451 | 6/1977 | Miller . | |
| 4,034,945 | 7/1977 | Sato | 248/103 |
| 4,124,190 | 11/1978 | Wheeler | 248/538 |
| 4,131,079 | 12/1978 | Rousseau, Jr. et al. | 116/22 |
| 4,327,669 | 5/1982 | Blasbalg . | |
| 4,767,088 | 8/1988 | Fielder et al. | 248/121 |
| 4,819,584 | 4/1989 | Rozumek . | |
| 4,867,104 | 9/1989 | Vandiver | 119/57.9 |
| 4,955,319 | 9/1990 | Brucker | 119/52.2 |
| 4,986,219 | 1/1991 | Harris | 119/57.8 |
| 5,003,734 | 4/1991 | Dinsmore | 119/57.9 |
| 5,033,411 | 7/1991 | Brucker | 119/52.1 |
| 5,040,491 | 8/1991 | Yancy | 119/57.8 |
| 5,095,847 | 3/1992 | Coffer | 119/52.2 |
| 5,165,364 | 11/1992 | Horkey | 119/57.8 |
| 5,207,180 | 5/1993 | Graham | 119/57.9 |

FOREIGN PATENT DOCUMENTS

| | | | |
|---|---|---|---|
| 108748 | 10/1943 | Sweden | 119/57.8 |
| 1529765 | 10/1978 | United Kingdom | 119/57.8 |
| 2209456 | 5/1989 | United Kingdom | 119/57.9 |

Primary Examiner—Gene Mancene
Assistant Examiner—Todd E. Manahan
Attorney, Agent, or Firm—Hugh D. Jaeger

[57] ABSTRACT

A bird feeder support system for suspending a bird feeder from a deck railing or like support, and of a sufficient length so as to be out of the reach of squirrels or like animals. The bird feeder support includes a U-shaped bracket for encompassing a deck railing, and upper and lower support members of which the lower member lockingly engages the U-shaped bracket at one end, and includes a hook at the end of the upper support member for engaging a bird feeder. The upper and lower support members can also be two or more components frictionally engaged with respect to each other. The lower support member can also include anti-squirrel structure, including alternating tubular members and alternating washers placed over the lower region of the lower support member so that the squirrel cannot have any footing areas or grasping areas.

4 Claims, 4 Drawing Sheets

BIRD FEEDER SUPPORT SYSTEM

BACKGROUND OF THE INVENTION

1. Field of the Invention

The present invention relates to bird feeder supports, and more particularly, pertains to a bird feeder support with a clamp and a long curved member for locking engagement into the clamp at one end supporting the bird feeder at the other end.

2. Description of the Prior Art

Bird feeders in the past have generally been held by either a rope, string or wire from a tree, or placed on a pole. Neither one of these supports are particularly desirable because squirrels can climb up or down the supports, eat the bird feed and scare away the birds.

The present invention overcomes the disadvantages of the prior art by providing a bird feeder support which is aesthetically pleasing and animal deterrent.

SUMMARY OF THE INVENTION

The general purpose of the present invention is a bird feeder support system which engages onto a deck railing, and supports a bird feeder away from the reach of animals. Also, the bird feeder support system is of such a size and length that it is very difficult for squirrels to walk and balance on the support. Finally, squirrel proof elements, including short alternating tubular members and washers can be engaged over the long member near the stem or along the top portion so that a squirrel cannot obtain any grasping or footing.

According to one embodiment of the present invention there is provided a bird feeder support system including a U-shaped encompassing bracket for engaging about and over a deck, opposing holes near the base of the clamp, a lower support member with a stem at one end and a curved upper support member and hook at the other end where a stem at the lower region of the lower support engages the opposing holes of the U-shaped clamp and the hook engages a bird feeder. A plurality of alternating short tubular members and washers can be engaged over the long member near the stem or upper portion for squirrel proofing the bird feeder support system so that the squirrel cannot obtain any footing or grasping, as the tubular members and washers will freely rotate. The long member can have a slight curvature and can be separated into components which frictionally engage with respect to each other for purposes of transportation or storage.

Significant aspects and features of the present invention include a bird feeder support system which simply engages a standard deck railing, and is easily installed with a minimum of hand tools. The bird feeder support system can be bolted or screwed to the deck railing.

Another significant aspect and feature of the present invention is a bird feeder support system which includes a plurality of alternating members about the stem for preventing a squirrel from obtaining a grasping surface or gripping surface. A plurality of alternating tubular members and washers freely rotate and would continue to rotate if any weight was placed on either one of the elements, such as the weight of a squirrel paw.

A further significant aspect and feature of the present invention is an animal proof bird feeder, preventing animals from reaching the bird feeder nor climbing along the long support member between the clamp and the bird feeder.

A further significant aspect and feature of the present invention is a lower support member which lockingly engages a U-shaped bracket without the use of clamping devices or tools so that the attending supported members cannot rotate in the U-shaped clamp member.

Another significant aspect and feature of the present invention is an animal proof bird feeder support which readily disengages from supporting U-shaped bracket and rotates for ease of access to the suspended bird feeder for the purpose of refilling.

Having thus described the embodiments of the present invention, it is the principal object hereof to provide a bird feeder support.

One object of the present invention is a bird feeder support system which can be installed with a minimum of tools in a matter of minutes.

Another object of the present invention is a bird feeder support which supports a bird feeder away from the reach of animals.

A further object of the present invention is a bird feeder support system which is literally animal proof, and especially squirrel proof.

A further object of the present invention is a bird feeder support system which simply locks into a bracket.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
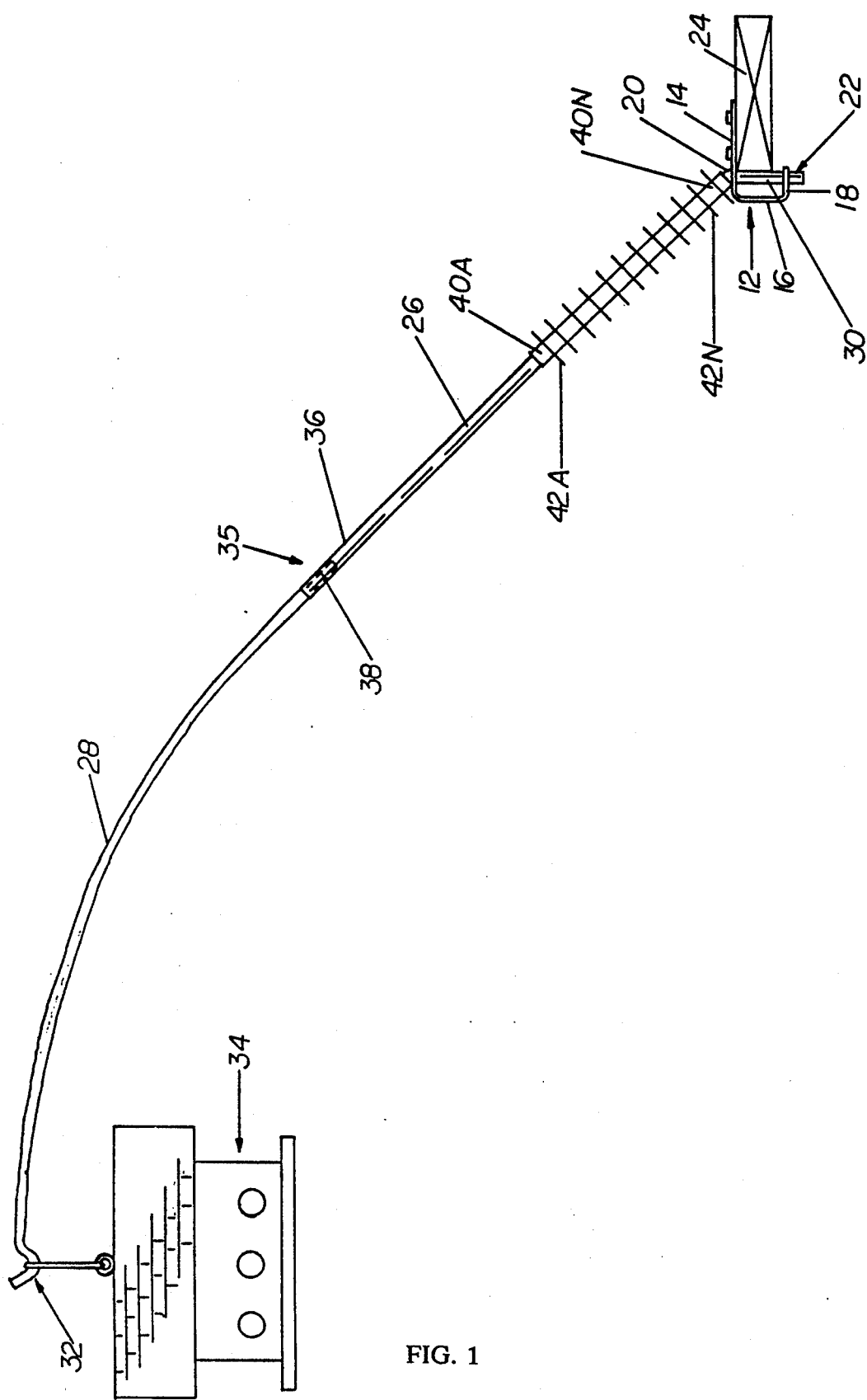
FIG. 1 illustrates a right side view of a bird feeder support, the present invention.

FIG. 1 illustrates a right side view of the bird feeder support system 10, the present invention, including a U-shaped bracket 12. The U-shaped bracket 12 includes an upper leg 14, a connecting member 16, and a lower leg 18. There are opposing holes 20 and 22. The U-shaped bracket 12 is of such a size as to engage over and secured to a standard deck railing, such as a 2×6 board 24. A support structure having a lower support member 26 and an upper curved support member 28 engages the U-shaped bracket 12. The lower support member 26 includes a vertically aligned stem segment 30 which engages holes 20 and 22 of the U-shaped bracket 12. The lower support member 26 extends at an angle from the stem segment 30 and can optionally include a slight amount of curvature similar to that of the upper curved support member 28. The upper curved member 28 includes a hook member 32 from which a bird feeder 34 is suspended. An optional frictional joint 35 can be provided with a socket 36 and a plug 38. Optionally more then one frictional joint may be used to provide for compactness of the invention for ease of supply or handling. A plurality of squirrel proof tubes 40a–40n can be engaged over the lower support member 26 or upper member 28 whichever is needed and rests adjacent the stem segment 30. These tubes 40a-40n will rotate with respect to each other when a squirrel or any other animal places their weight onto the tubes such as by grasping, gripping or stepping on the tubular surfaces. Further, a plurality of washers 42a-42n can be alternately placed over the lower support member 26 and upper support member 28 if needed between the rotating tubes 40a-40n. In the alternative, the washers can be secured to the tubes while still providing the same function.

Figure 2:
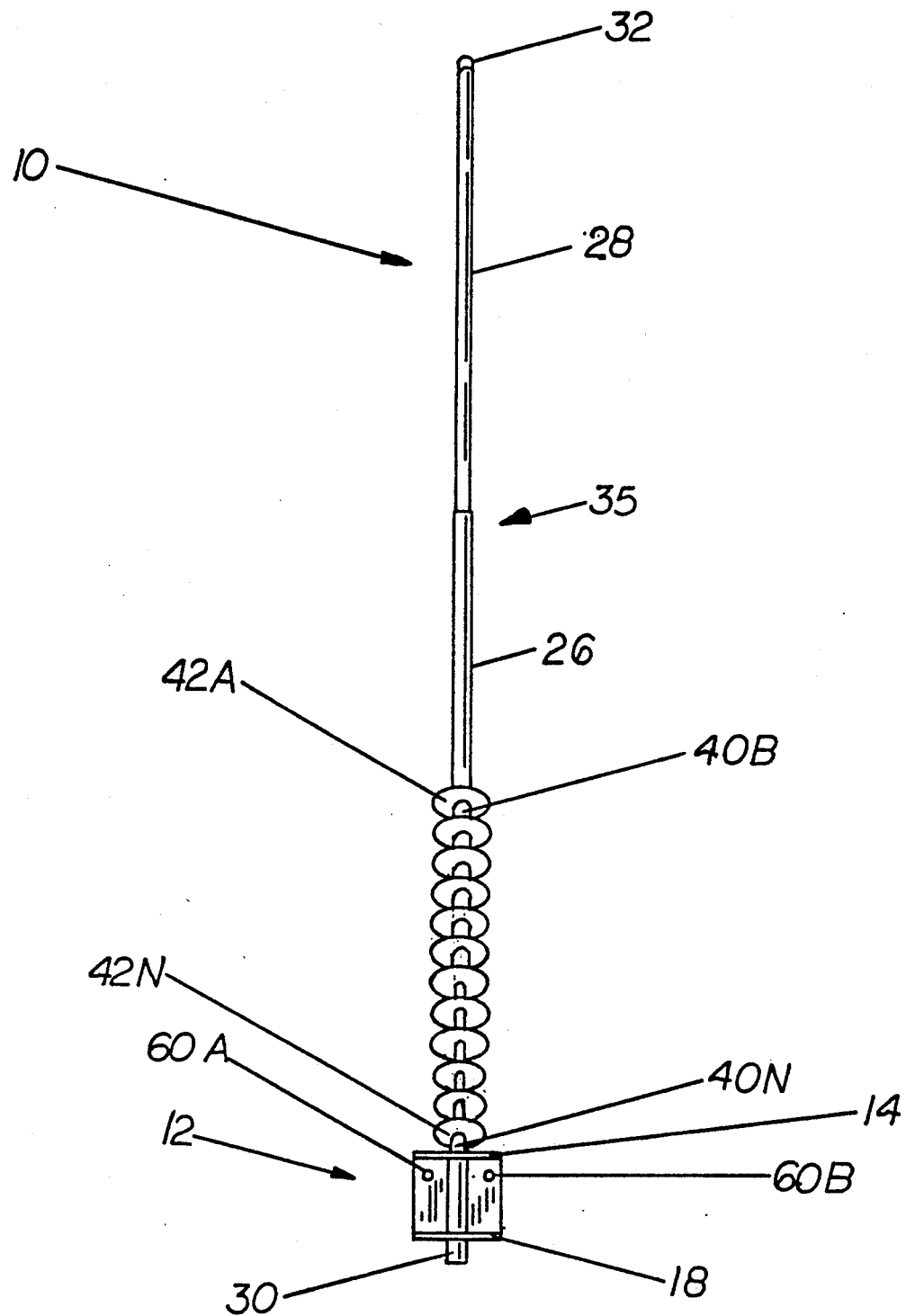
FIG. 2 illustrates an end view.

FIG. 2 illustrates an end view of the bird feeder support system 10 where all numerals correspond to those elements previously described.

Figure 3:
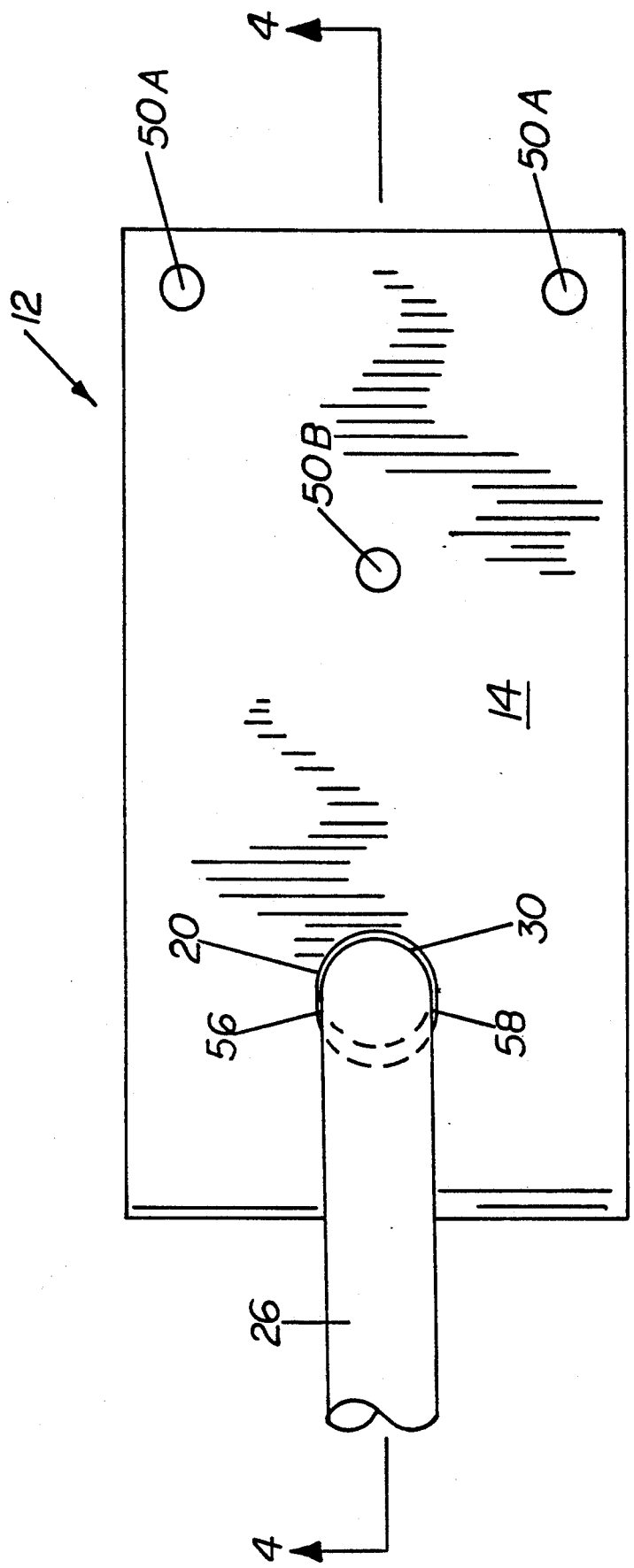
FIG. 3 illustrates a top view of the U-shaped clamp.

FIG. 3 illustrates a top view of the U-shaped bracket 12 where all numerals correspond to those elements previously described. A plurality of body holes 50a-50n in the upper leg 14 provide for a method of securement of the U-shaped bracket 12, such as by lag screws, bolts, or the like. The stem 30 is simply inserted through holes 20 and 22 until the lower support 26 contacts the edge of the elongated hole 20 which is a locking hole. Hole 20 in the upper leg 14 is elongated and provides for locking of the lower support member 26 and its associated components into the hole 20 to preclude azimuthal rotation about and within the hole 20 as further illustrated in FIG. 4. The washers 42a-42n and the squirrel proof tubes 40a-40n are removed for brevity and clarity of illustration.

Figure 4:
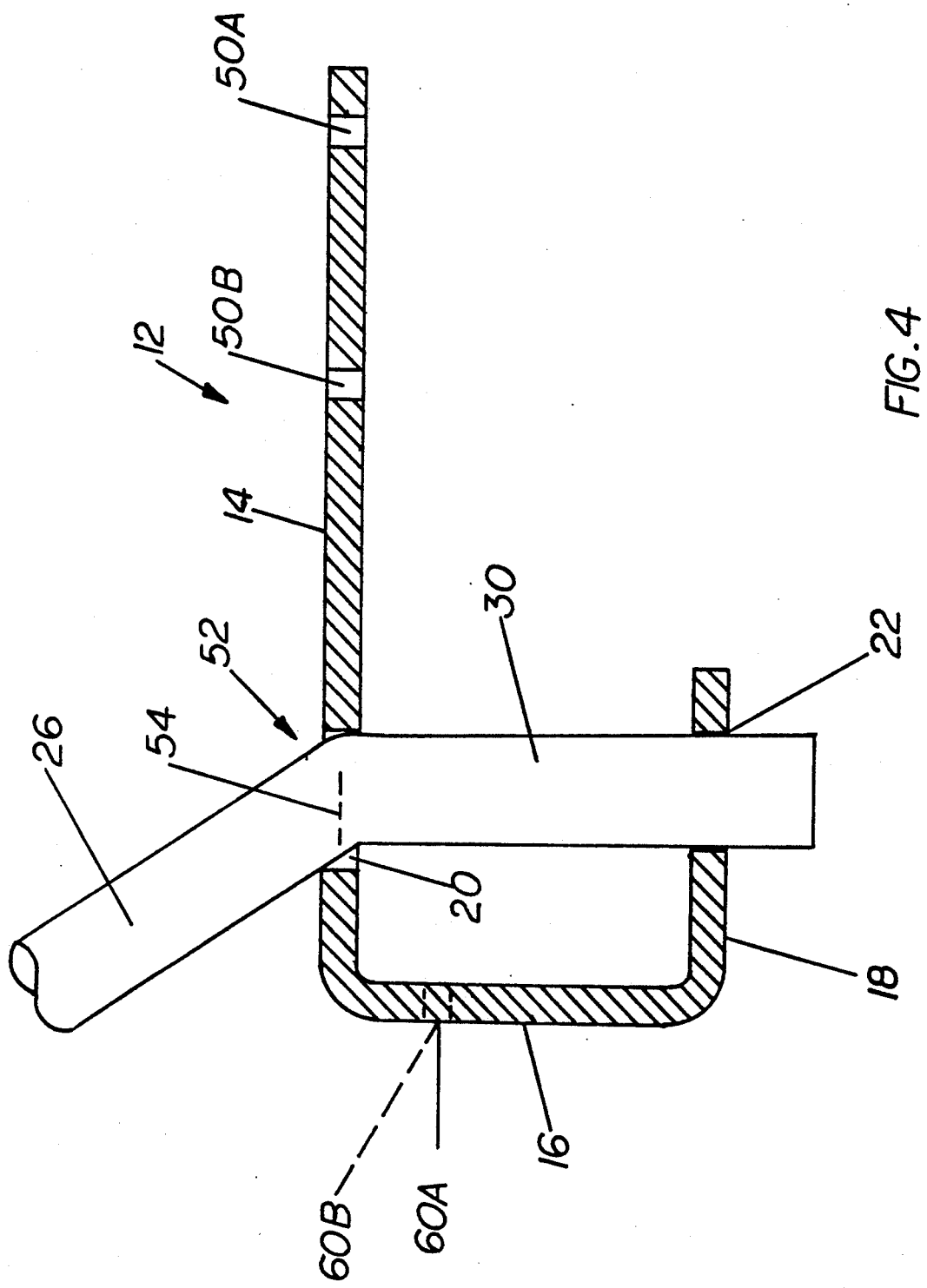
FIG. 4 illustrates a view in cross section along line 4—4 of FIG. 3.

FIG. 4 illustrates a cross-sectional view along the center line of FIG. 3 where all numerals correspond to those elements previously described. Illustrated in particular is the angled transitional portion 52 between the main portion of the lower support member 26 and the stem 30. The angled transitional portion 52 sits well down into the elongated hole 20 to the point at which the circumferential points of the lower support member as indicated by dashed line 54 contact the inner sides of the elongated hole 20, thus restricting rotational movement of the stem 30 and connected components. These contact points are further illustrated as points 56 and 58 on FIG. 3. Holes 60a and 60b, also illustrated in FIG. 3, can be used to mount the U-shaped bracket 12 to a vertical board or wall mount or can also be used to secure the U-shaped bracket 12 to a railing.

MODE OF OPERATION

The U-shaped bracket 12 is engaged over a deck railing and the lower and upper support members 26 and 28 is then slidingly engaged with the U-shaped bracket. The stem 30 is simply inserted into the U-shaped bracket 12 where it is locked against rotation. A bird feeder is then engaged over and about the hook 32. The optional tubular members 40a-40n and alternating washers 42a-42n can engage over the lower support member 26 near the stem 30. Preferably, the lower support member 26 would include a socket 36 and the upper support member 28 would include a plug 38 for engagement of the upper and lower support member 28 and 26.

Various modifications can be made to the present invention without departing from the apparent scope hereof.

I claim:

1. A bird feed support system comprising:
   a. a U-shaped bracket means for engaging over a deck railing and including two opposing holes;
   b. an upper support member with a slight degree of curvature and including a plug at a lower end thereof;
   c. a continuous lower support member having a socket at an upper end thereof which receives said plug of said upper support member;
   d. a stem at a lower end of said lower support member engaging into said opposing holes of said bracket means, said lower support member extending upwardly from said stem at an angle to the horizontal; and
   e. a hook at an upper end of said upper support member for engaging a bird feeder.

2. The system of claim 1 including a plurality of tubular members and alternating washers over said lower support member and adjacent to the stem, whereby said alternating tubular members and washers rotate, preventing an animal from obtaining a gripping, grasping or standing surface.

3. The system of claim 1 where said bracket includes an elongated locking hole means for preventing rotation of said lower support member within or about said bracket.

4. A bird feeder support system comprising:
   a. a U-shaped bracket means for engaging over a deck railing and including two opposing holes;
   b. an upper support member with a slight degree of curvature and including a plug at a lower end thereof;
   c. a continuous lower support member having a socket at an upper end thereof which receives said plug of said upper support member;
   d. a stem at a lower end of said lower support member engaging into said opposing holes of said bracket means, said lower support member extending upwardly from said stem at an angle to the horizontal;
   e. a hook at an upper end of said upper support member for engaging a bird feeder; and
   f. a plurality of tubular members and alternating washers over said lower support member and adjacent to the stem, whereby said alternating tubular members and washers rotate, preventing an animal from obtaining a gripping, grasping or standing surface.

* * * * *